United States Patent

Takahashi

[11] Patent Number: 6,058,316
[45] Date of Patent: May 2, 2000

[54] DUAL MODE MOBILE TELEPHONE APPARATUS WITH USER SELECTED ANALOG AND DIGITAL CALL MODES

[75] Inventor: Katsumi Takahashi, Hyogo-ken, Japan

[73] Assignee: Mitsubishi Denki Kabushiki Kaisha, Tokyo, Japan

[21] Appl. No.: 08/139,876

[22] Filed: Oct. 22, 1993

Related U.S. Application Data

[63] Continuation of application No. 07/790,177, Nov. 12, 1991, abandoned.

[30] Foreign Application Priority Data

Feb. 6, 1991 [JP] Japan ................................. 3-035132

[51] Int. Cl.[7] ......................................... H04Q 7/32
[52] U.S. Cl. ................................. 455/552; 455/32.1
[58] Field of Search ............................ 370/18; 379/56, 379/58, 59, 63, 90, 93, 97, 98; 455/89, 33.1, 552, 32.1

[56] References Cited

U.S. PATENT DOCUMENTS

| | | | |
|---|---|---|---|
| 4,712,229 | 12/1987 | Nakamura | 379/58 |
| 4,868,560 | 9/1989 | Oliwa et al. | 340/825.44 |
| 5,020,092 | 5/1991 | Phillips et al. | 379/59 |
| 5,020,093 | 5/1991 | Pireh | 379/59 |
| 5,054,042 | 10/1991 | Soury et al. | 379/58 |
| 5,054,052 | 10/1991 | Nonami | 379/57 |
| 5,109,403 | 4/1992 | Sutphin | 379/59 |
| 5,119,397 | 6/1992 | Dahlin et al. | 375/5 |
| 5,127,042 | 6/1992 | Gillig et al. | 379/59 |
| 5,187,809 | 2/1993 | Rich et al. | 455/33.1 |
| 5,228,074 | 7/1993 | Mizikovsky | 379/59 |
| 5,263,079 | 11/1993 | Umemoto | 379/58 |
| 5,276,917 | 1/1994 | Vanhanen et al. | 455/89 |
| 5,335,355 | 8/1994 | Tanaka et al. | 455/33.1 |

FOREIGN PATENT DOCUMENTS 1282929   11/1989   Japan ..................................... 379/59

OTHER PUBLICATIONS

Motorola, "Dyna T.A.C 6000X", 1984.
Fisher, "Dual Mode Mobile Unit for Next Generation Digital Narrow Chanel Cellular Telephone System" Sep. 1988 IEEE.
Qualcomm, "CD-7000 CDMA Digital Portable Phone", 1993.

*Primary Examiner*—William Cumming
*Attorney, Agent, or Firm*—Rothwell, Figg, Ernst & Kurz

[57] ABSTRACT

A dual mode mobile telephone apparatus includes a transmitting/receiving portion (2, 3) for different kinds of modes, an operation portion (4) for assigning an available call mode, a call mode detection portion (13) for detecting the call mode, a call mode store portion (11) for storing a call mode, a response signal generating portion (12) for generating a response signal and changing the call mode, a call mode changing signal generation portion (14) for generating a call mode changing signal. Accordingly, the dual mode mobile telephone apparatus of the present invention is capable of changing the mode as determined by the user at any time or automatically.

6 Claims, 12 Drawing Sheets

DUAL MODE MOBILE TELEPHONE APPARATUS WITH USER SELECTED ANALOG AND DIGITAL CALL MODES

This is a continuation of application Ser. No. 07/790,177, filed Nov. 12, 1991 now abandoned.

BACKGROUND OF THE INVENTION

1. Field of the Invention

The invention relates to a dual mode mobile telephone apparatus which is applicable to a mobile station in a mobile radio communication system. More particularly, the present invention relates to a dual mode mobile telephone apparatus having a plurality of different communication modes, such as an analog radio channel and a digital radio channel, which is able to communicate using either mode.

2. Description of the Prior Art

Figure 14:
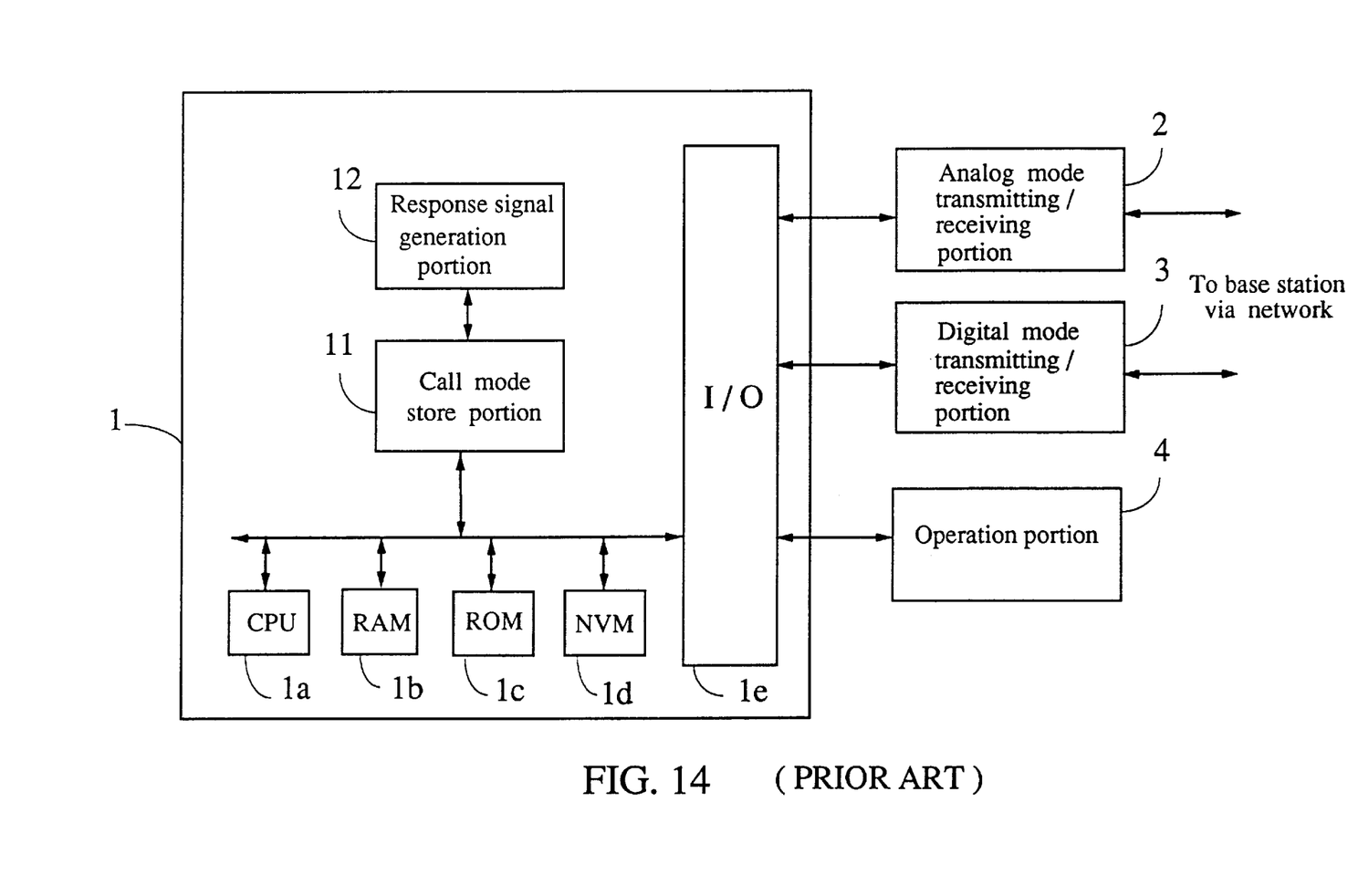
FIG. 14 is a block diagram of a dual mode mobile telephone apparatus of a conventional art.

FIG. 14 shows a block diagram of the conventional dual mode mobile telephone apparatus which is applied to a mobile station in the mobile radio communication system. In FIG. 14, a control portion 1 consists of a CPU 1a, a random access memory RAM 1b, a read only memory ROM 1c, a non-volatile memory NVM 1d and an input/output port I/O 1e. The control portion 1 controls all portions of the dual mode mobile telephone apparatus. An analog mode transmitting/receiving portion 2 is controlled by the control portion 1 and transmits or receives an analog signal between the mobile station and the base station via the network. A digital mode transmitting/receiving portion 3 is also controlled by the control portion 1 and transmits or receives the digital signal between the mobile station and the base station via the network. An operation portion 4 has a plurality of function keys and sends the information to the control portion 1. A call mode store portion 11 stores a call mode which assigns, for example, the analog mode or the digital mode of the dual mode for the mobile radio communication system. The call mode portion 11 is stored, for example, in the NVM 1d in the control portion 1. A response signal generating portion 12 generates a response signal which is sent back to the base station according to the calling signal for the station from the base station. The response signal includes the calling signal stored in the call mode store portion 11. The response signal generating portion 12 may be constructed from, for example, the software functions of the CPU 1a in the control portion 1.

The operation of the above conventional art is explained hereinafter using FIG. 14 and FIG. 12.

Figure 12:
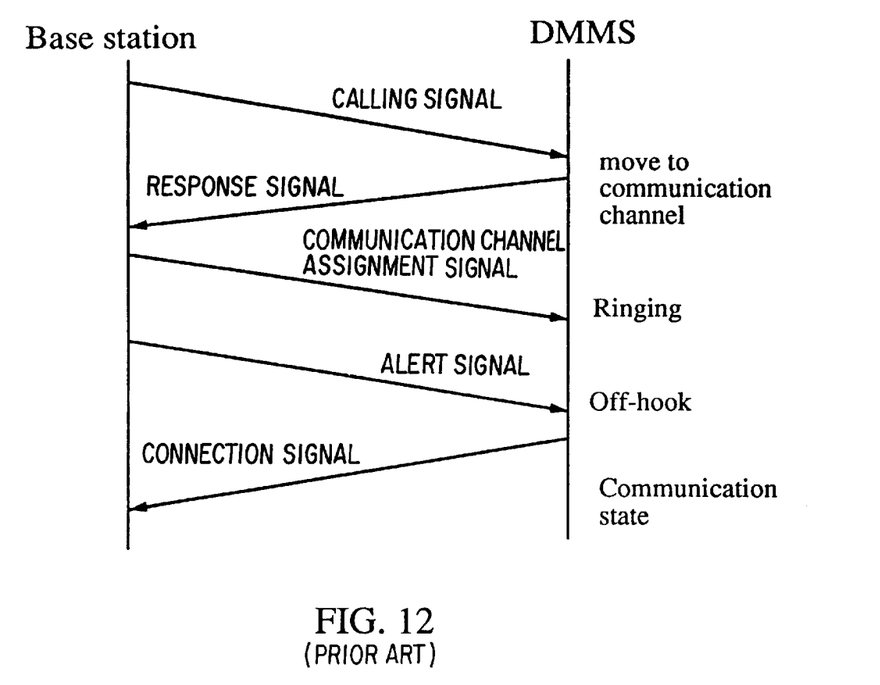
FIG. 12 is a flow chart which shows an operation sequence of the first embodiment and conventional art.

FIG. 12 is a time chart which explains the signal flow between the base station and dual mode mobile station (DMMS).

When the power source is switched on, the control portion 1 searches, for example, an analog control channel. When the control portion 1 finds the analog channel, an order signal such as a system information and calling signal is transmitted or received using the analog channel. This state is called "idle state".

Firstly in the idle state, suppose that a calling signal is transmitted from the base station to the dual mode mobile telephone apparatus. An assigned dual mode mobile telephone apparatus sends back the response signal to the base station, which is generated in the response signal generating portion 12 of the control portion 1. The response signal indicates a communication mode in which the dual mode mobile telephone apparatus can communicate with the base station.

Figure 13:
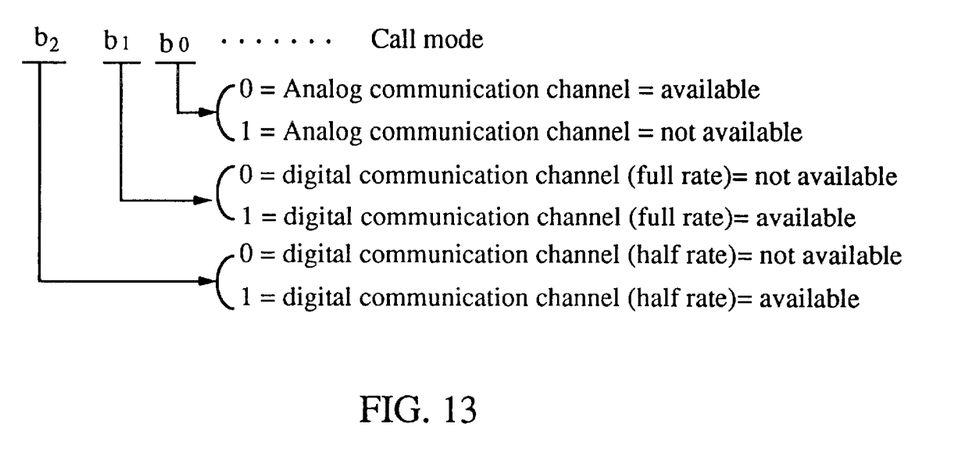
FIG. 13 is a bit configuration of the call mode in the first embodiment and conventional art.

FIG. 13 shows a construction of a call bit. The call mode is consisted of three bits, they are $b_0$ bit which indicates an analog channel, $b_1$ bit which indicates a full rate digital channel, $b_2$ bit which indicates a half rate digital channel. In the dual mode mobile telephone apparatus which can be available both analog channel and digital channel, the call mode is expressed by ($b_2$, $b_1$, $b_0$) bits. And the combination of the three bits fixed as "110", "010" or "100" in the call mode store portion 11. In the private analog mobile station, "000" is allocated to a call mode which can be available only analog mode.

When the calling signal is inputted to the dual mode mobile telephone apparatus, the response signal including, for example, a digital signal "110" indicating availability to communicate with both analog and digital modes, is returned back to the base station. The base station analyzes the response signal, and recognizes that the dual mode mobile telephone apparatus is available to both analog and digital modes. Then the base station sends the assignment signal which assigns either the analog mode or the digital mode. The selection of the call mode is decided by the base station.

The dual mode mobile telephone apparatus selects the operation mode according to the assignment signal from the base station. Then, when the dual mode mobile telephone apparatus receives the alert signal from the base station, the dual mode mobile telephone apparatus lets the user know the incoming signal by the ringing tone or the display. Then, when the user takes the hook off or makes the corresponding operation from the keyboard, the control portion 1 sends the connection signal to the base station. The line then becomes the communication channel between the DMMS and the base station. Similar conventional dual mode mobile telephone apparatus is disclosed in Japanese laid-open patent publication (Tokkai-hei 1-282929).

As discussed above, this apparatus is designed so that the selection of the call mode is decided only by the base station. Therefore, when the two modes are different with respect to the service type and/or the call charges, the user can not select the call mode which he likes, even if the user wants one of the modes.

It is accordingly a primary object of the present invention to provide a dual mode mobile telephone apparatus in which the user can select one of the modes at any time, even during the communication state.

SUMMARY OF THE INVENTION

In accordance with the present invention, there is provided a dual mode mobile telephone apparatus for transmitting and receiving a signal between a base station and a mobile station using a radio line including, a transmitting/receiving portion for transmitting and receiving signals of different kinds of modes, an operation portion for assigning an available call mode for the mobile station, a call mode detection portion for detecting the call mode which is inputted from the operation portion, a call mode store portion for storing a call mode which is detected by the call mode detection portion, and a response signal generating portion for generating a response signal which is sent back to the base station in response to the calling signal from the base station.

DETAILED DESCRIPTION OF THE PREFERRED EMBODIMENTS (First Embodiment)

Figure 1:
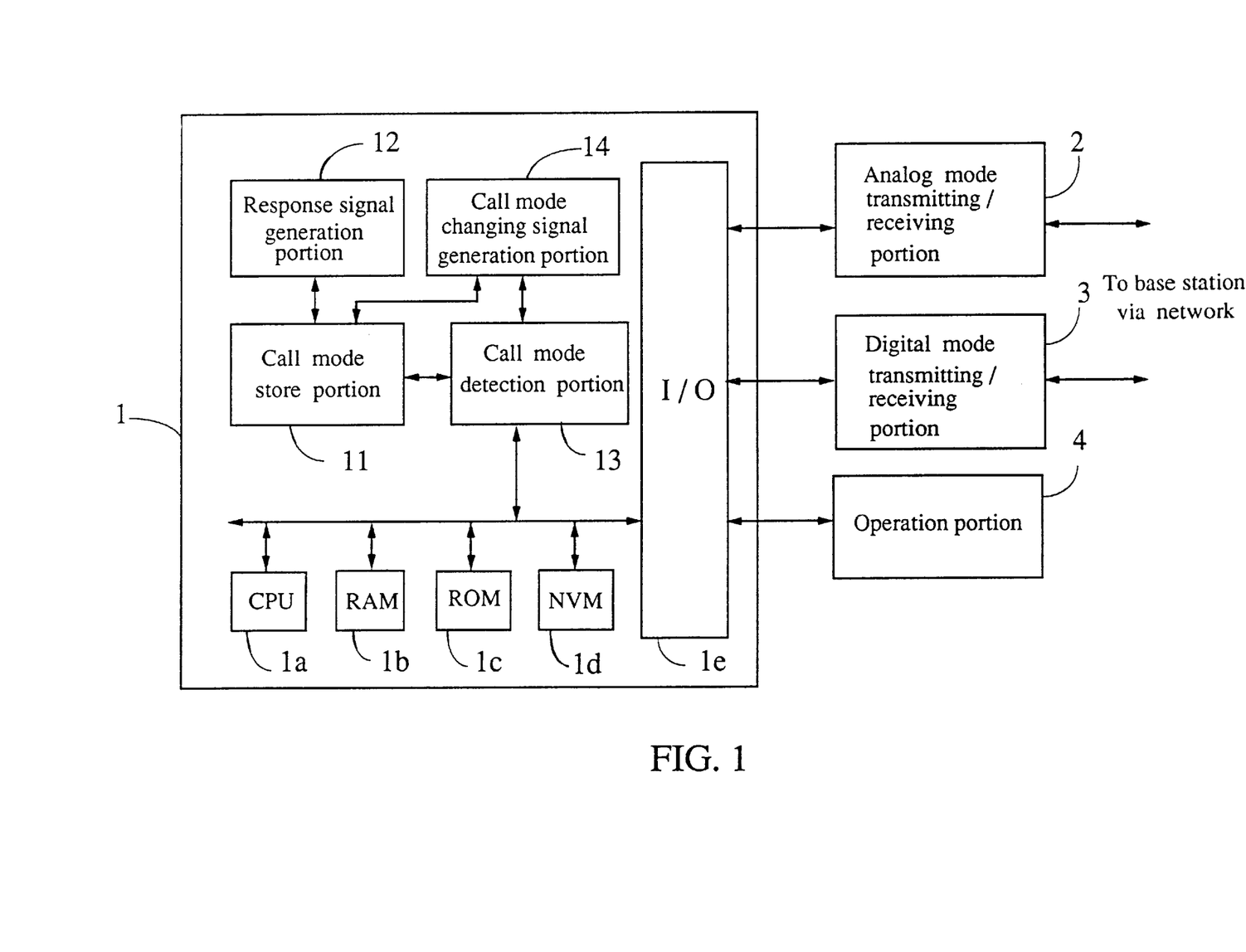
FIG. 1 is a block diagram of a first and third embodiment of a dual mode mobile telephone apparatus of the present invention.

FIG. 1 shows a block diagram of a dual mode mobile telephone apparatus of the present invention which is applied to a mobile station in the mobile radio communication system. In FIG. 1, a control portion 1 includes a read only memory ROM 1$c$, a random access memory RAM 1$b$, a non-volatile memory NVM 1d and input/output port I/O 1$e$. The control portion 1 controls all portions of the dual mode mobile telephone apparatus. An analog mode transmitting/receiving portion 2 is controlled by the control portion 1 and transmits or receives the analog signal between the base station. A digital mode transmitting/receiving portion 3 is also controlled by the control portion 1 and transmits or receives the digital signal between the base station and DMMS. An operation portion 4 has a plurality of function keys and send the information to the control portion 1. A call mode store portion 11 stores a call mode which assigns, for example, the analog mode or digital mode in the dual mode of the mobile radio communication systems. The call mode portion is stored, for example, in the NVM of the control portion 1. A response signal generating portion 12 generates a response signal which is sent back to the base station according to the calling signal for the own station from the base station. The response signal includes the call mode stored in the call mode store portion 11. The response signal generating portion 12 may be constructed from, for example, the software functions of the CPU 1$a$ in the control portion 1. A call mode detection portion 13 detects the call mode which is inputted from the operation portion 4 and stored to the call mode store portion 11. A call mode changing signal generation portion 14 generates a call mode changing signal according the call mode detected in the call mode detection portion 13. The call mode changing signal generation portion 14 may be constructed from, for example, the software functions of the CPU 1$a$ in the control portion 1.

The operation of the above first embodiment of FIG. 1 is explained hereinafter. The call mode detection portion 13 of the control portion 1 continuously supervises the operation portion 4 and checks whether the user inputs the communication mode selection signal. The check is executed periodically at a predetermined interval or at a time when the user inputs the selection signal from the operation portion 4.

Figure 2:
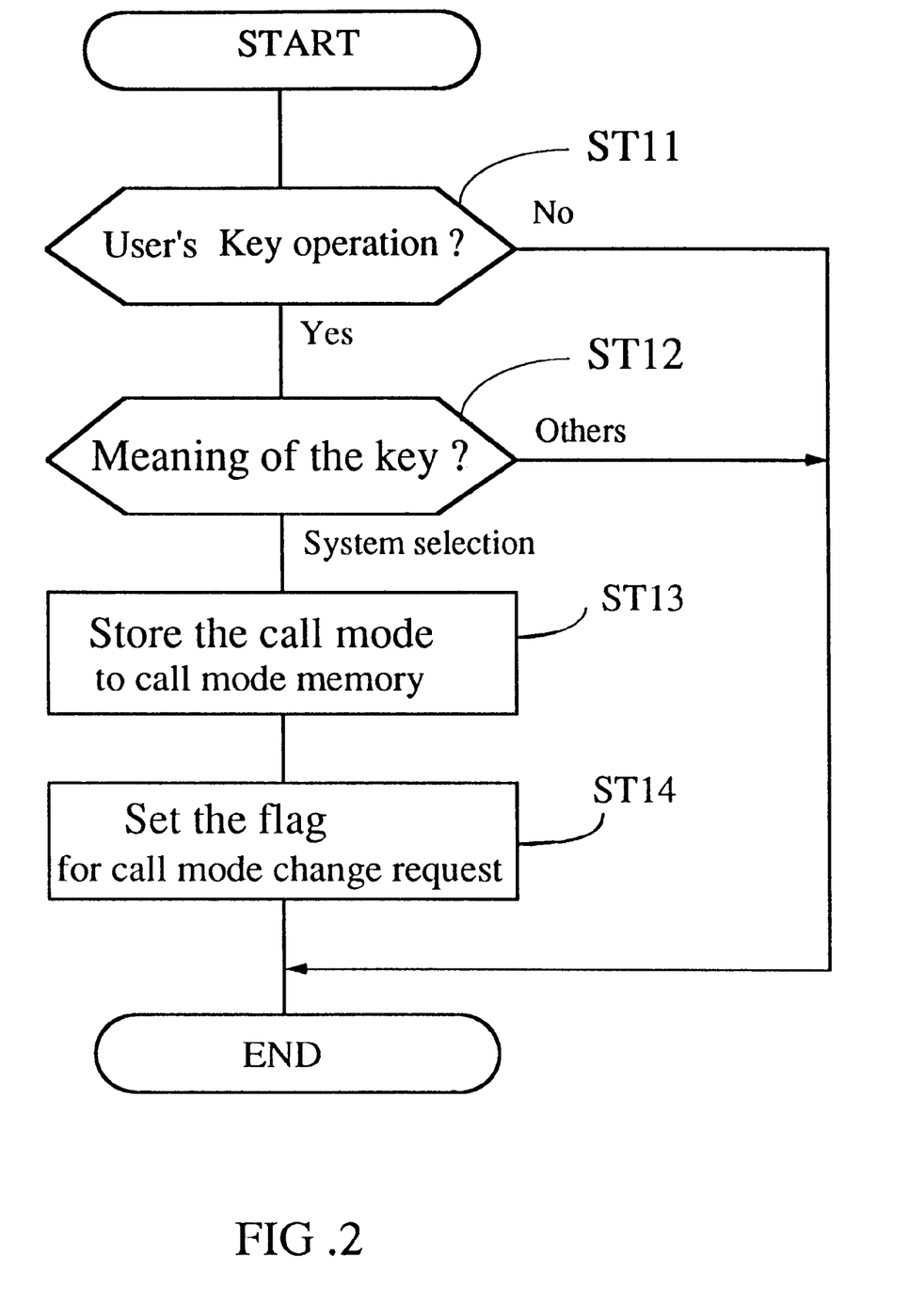
FIG. 2 is a flow chart which shows a check sequence for the keyboard.

FIG. 2 is a flow chart of the call mode detection portion 13 which shows check sequence of the keyboard.

Firstly, in step ST 11, the call mode detection portion 13 detects whether the user operates the keyboard. If the user operates the keyboard, the meaning of the input is judged by step ST 12. As a result of the judgment, if the operation is the selection of the communication mode, the call mode input from the keyboard is stored in the call mode store portion 11 by ST 13. In step ST 14, the control portion 1 sets the call mode changing flag in the call mode changing signal generation portion 14.

Figure 3:
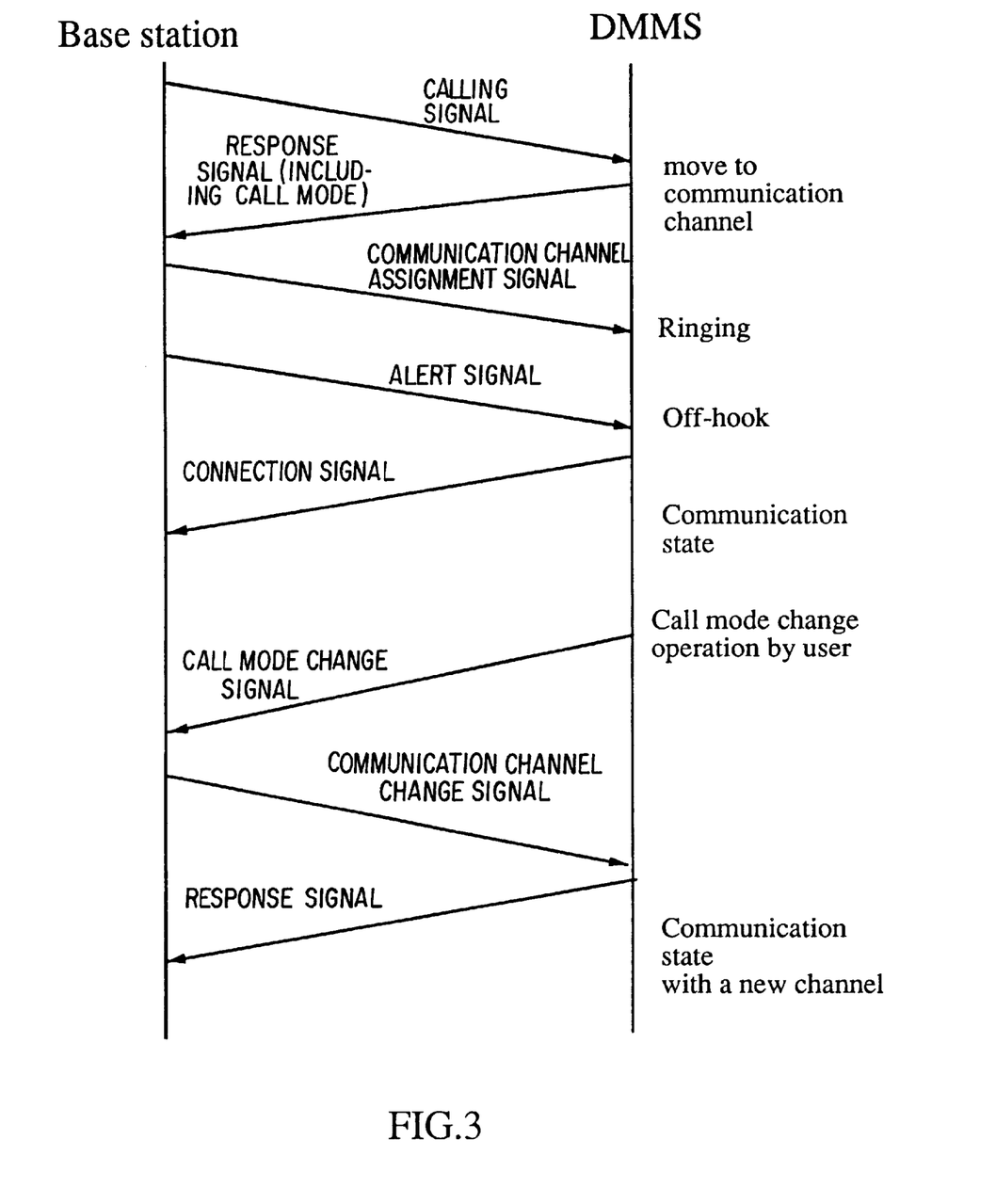
FIG. 3 is a time chart which shows an operation sequence of the first embodiment.
Figure 4:
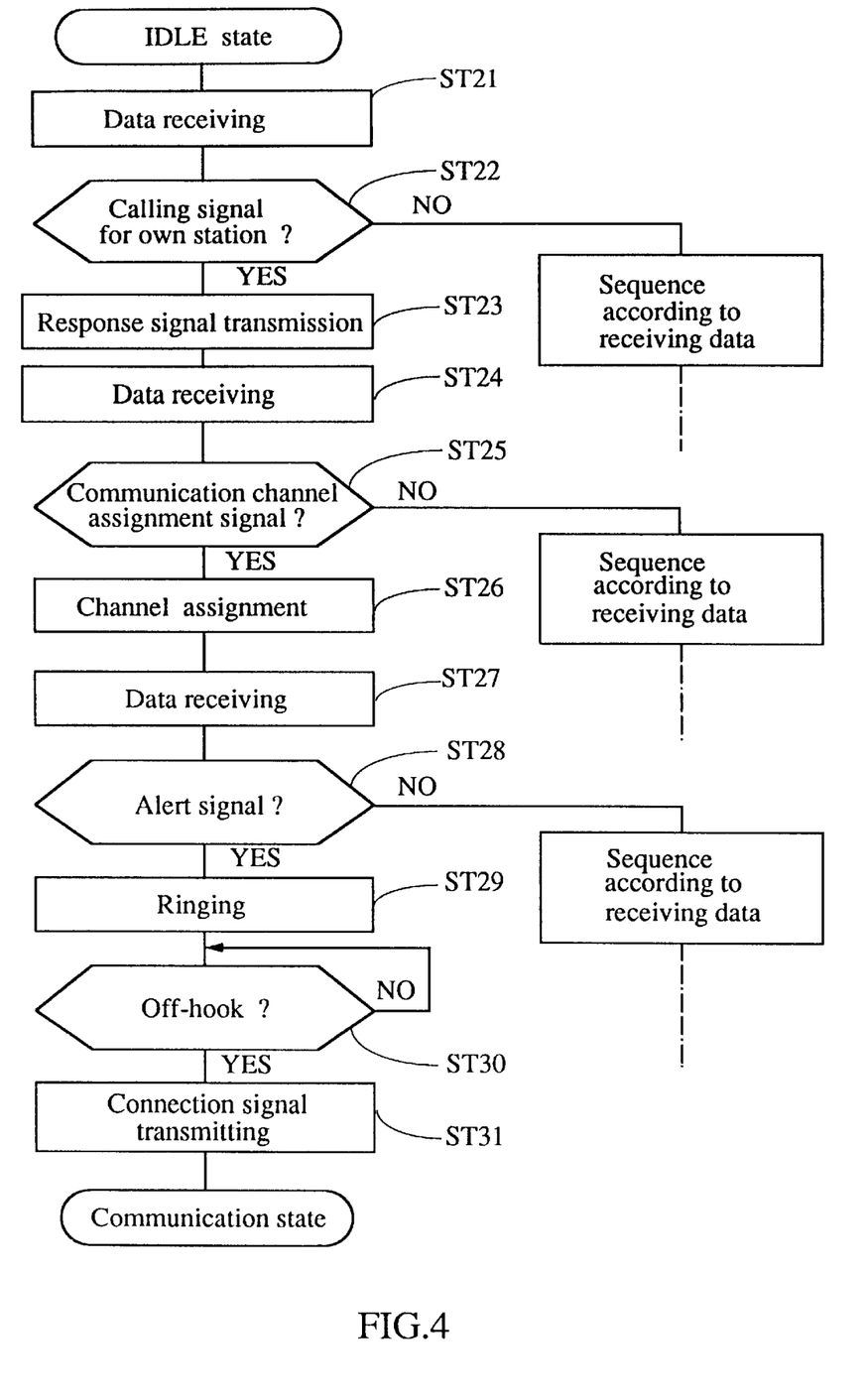
FIG. 4 is a flow chart which shows a sequence changing from the idle state to the communication state.

A call connection operation of the above first embodiment is explained hereinafter using FIG. 3 and FIG. 4. FIG. 3 is a time chart which shows the operation sequence of the first embodiment. FIG. 4 is a flow chart which shows a sequence changing from the idle state to the communication state. The operation sequence from the calling signal to the connection signal in FIG. 3 is the same as the conventional time chart shown in FIG. 12. When the mobile station receives the signal from the base station, the call mode detection portion 13 judges whether it is a calling signal for its own station at step ST 21 in FIG. 4. If the calling signal is for hits own station, the response signal generating portion 12 generates the response signal and sends it to the base station at step ST 23. The response signal includes the call mode which is stored in the call mode store portion 11 by the user from the keyboard. The response signal is detected by the call mode detection portion 13. If the mobile station is set so as to receive only a full rate digital communication channel, the call mode indicates such as "011" as explained in FIG. 13.

The base station receive the response signal and knows that the mobile station sending the response signal can be available only for a full rate digital communication channel. Then the base station sends the assignment signal, which assigns the communication channel of the identified mode, to the mobile station. The call mode detection portion 13 judges the received assignment signal from the base station at step ST 25. The control portion 1 assigns the digital communication mode at step ST 26. Next time, if the call mode detection portion 13 judges the received signal is an alert signal, the control portion 1 sends the alert signal to the user by the ringing or display at step ST 29. Then, when the call mode detection portion 13 detects the off-hook or the corresponding key operation, the control portion 1 sends back the connection signal to the base station and enters into the communication state.

Next, the mode change operation is explained when the user requests the mode change from the keyboard during the communication state.

During the communication state, if the user wants to change to the analog mode, and inputs the mode change signal from the keyboard, the call mode stored in the call mode store portion 11 of FIG. 1 is changed to "000" for "$b_2$, $b_1$, $b_0$". Then, the call mode change request flag is set to the call mode changing signal generation portion 14.

Figure 5:
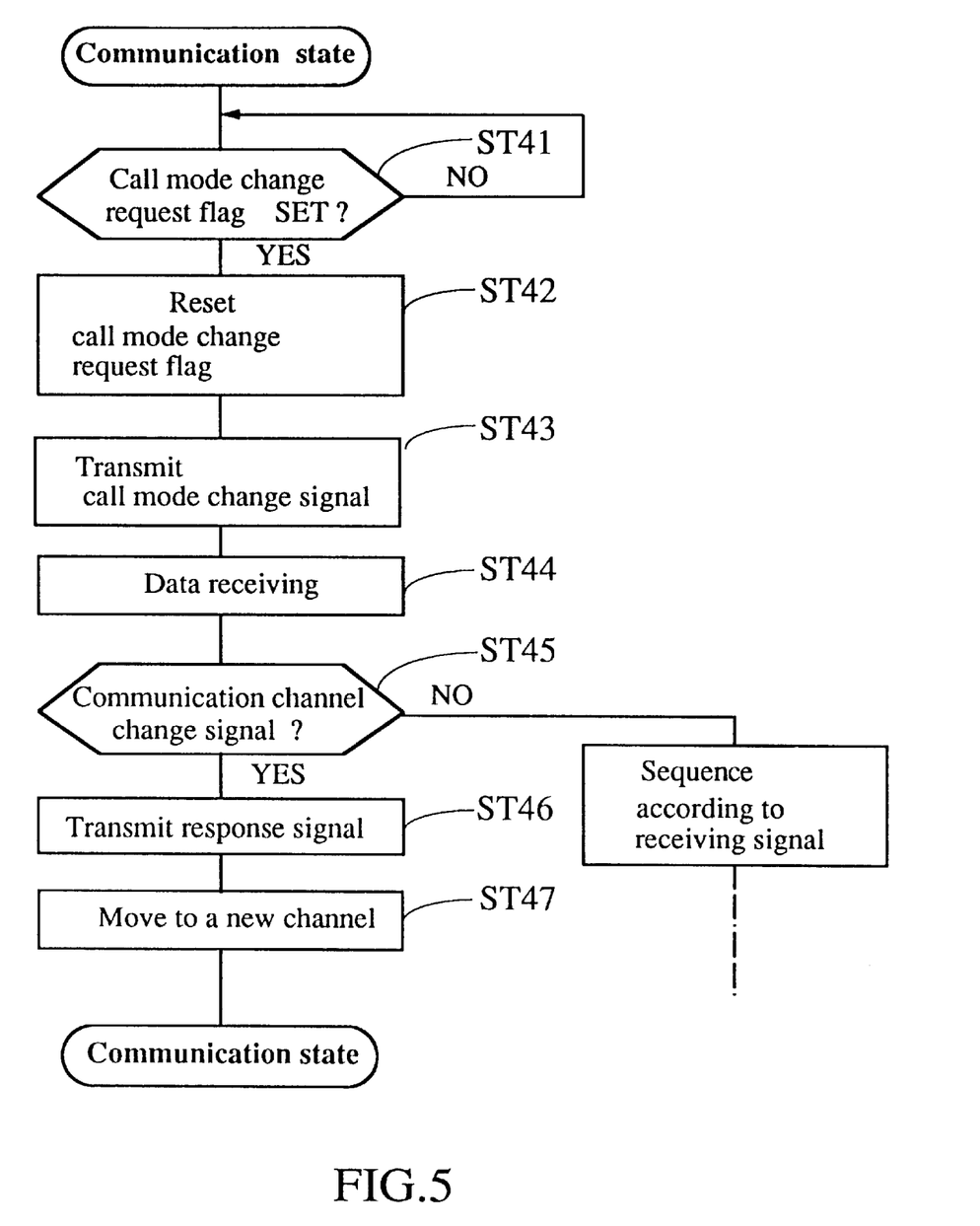
FIG. 5 is a flow chart which shows the sequence in which the call mode is changed during the communication state.

FIG. 5 is a flow chart which shows the sequence in which the call mode is changed during the communication state.

The control portion 1 judges whether the call mode change request flag is set at step ST 41. If the flag is set, control portion 1 resets the flag at step ST 42, and sends the call mode change signal to the base station from the call mode changing signal generation portion 14 at step ST 43. When the base station receives the call mode change signal, the base station sends the communication change signal which assigns the analog channel to the mobile station. When the call mode detection portion 13 receives and judges the communication change signal at step ST 45, the control portion sends back the response signal corresponding to the communication change signal at step ST 46. Then the sequence moves to the communication state at step ST 47.

(Second Embodiment)

In the above embodiment, it is noted that the dual mode mobile telephone apparatus having analog mode and digital mode can be changed even during the communication state. But, the present invention may be applied to a dual mode mobile telephone apparatus having non-compatibility between the two analog modes regarding frequency, radio channel space and call connection protocol.

Figure 6:
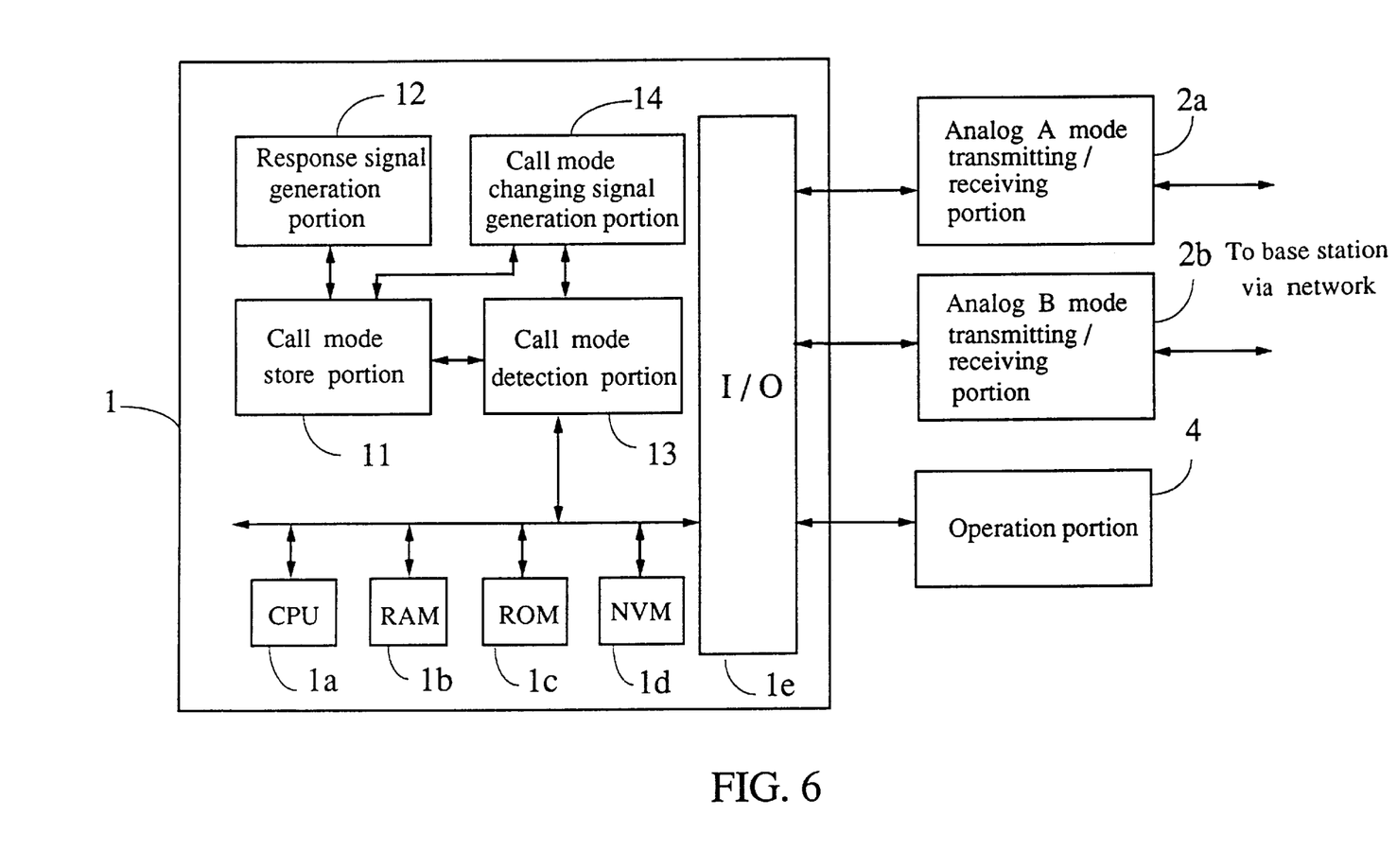
FIG. 6 is a block diagram of a second embodiment of a dual mode mobile telephone apparatus of the present invention.

FIG. 6 is a block diagram of a second embodiment of a dual mode mobile telephone apparatus of the present invention. In FIG. 6, an analog mode transmitting/receiving portion 2a is controlled by the control portion 1 and transmits or receives the analog signal between the mobile station and base station via the network. Another analog mode transmitting/receiving portion 2b is controlled by the control portion 1 and transmits or receives the analog signal between the mobile station and base station via the network. The transmitting/receiving portions 2a and 2b have no compatibility between them, and therefore they can not be switched during communications without cutting the communication. In FIG. 6, the same reference numbers used in FIG. 1 are used for the same portions or the corresponding portions. Accordingly the detailed explanation of such portions is omitted in connection with the same reference numbers.

The operation of the second embodiment is explained hereinafter using FIG. 6 and FIG. 7.

Figure 7:
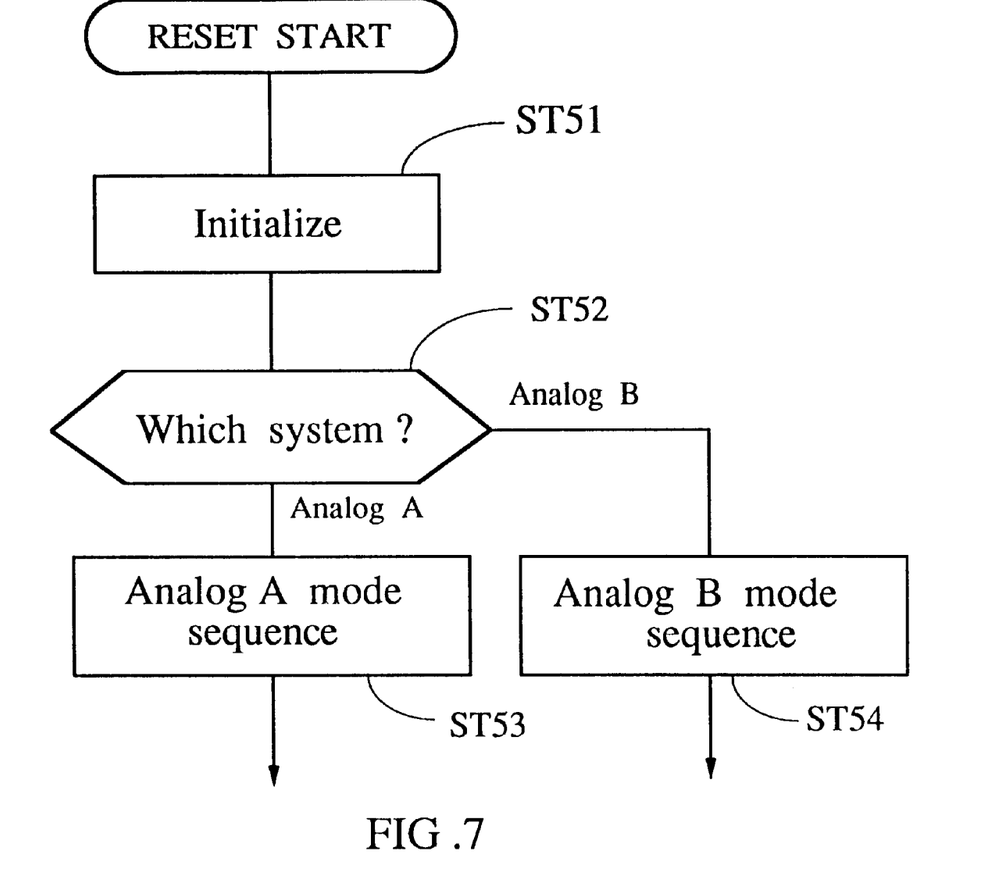
FIG. 7 is a flow chart which shows a mode change sequence of the second embodiment.

FIG. 7 is a flow chart which shows the mode change sequence of the second embodiment.

Figure 8:
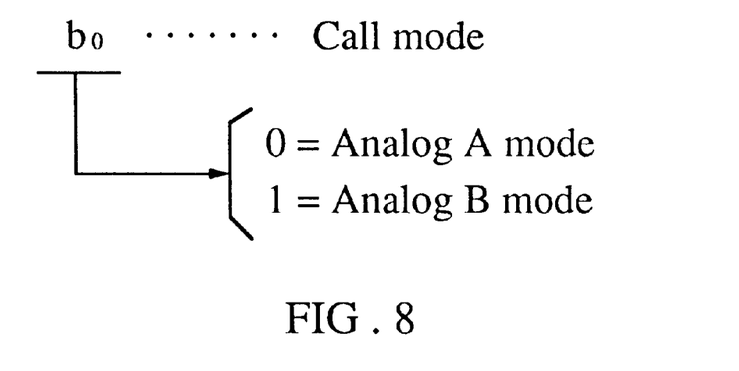
FIG. 8 is a bit configuration of the call mode in the second embodiment.

In the second embodiment, if the user wants to change the mode, he inputs the mode change instruction to the keyboard. The control portion 1 detects the mode change instruction from the keyboard, and initializes the operation of the analog A mode portion 2a, analog B mode portion 2b, the hardware in the operation portion 4 and the RAM 1b, and the I/O portion 1e in the control portion 1 all at step ST 51. The control portion 1 judges the call mode which is stored in the call mode store portion 11 at step ST 52. FIG. 8 shows the bit configuration of the call mode bit $b_0$ of the second embodiment. The call mode consists of $b_0$ bit. If the $b_0$ bit is "0", then the call mode indicates an analog A mode, and if the $b_0$ bit "1", then it indicates an analog B mode as shown in FIG. 8. At step ST 52, if the $b_0$ bit is "0", then analog A mode is executed at step ST 53, and if the $b_0$ bit is "1" then analog B mode is executed at step ST 54.

Figure 9:
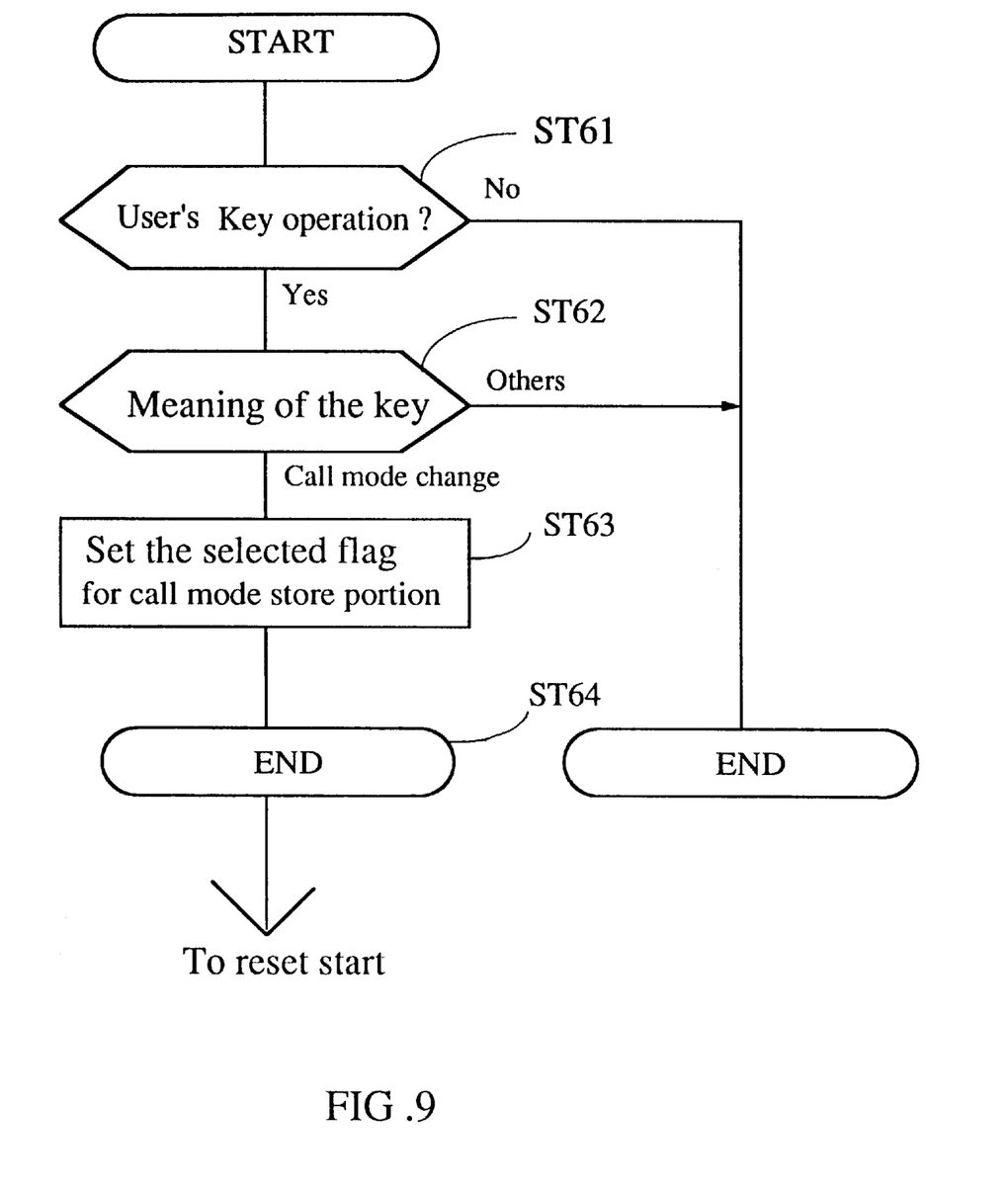
FIG. 9 is a flow chart which shows a sequence changing the call mode during the communication state.

Next, in FIG. 9, the mode change operation is explained when the user requests the mode change from the keyboard during the communication state.

FIG. 9 is a flow chart which shows the sequence for changing the call mode during the communication state.

In FIG. 9, the call mode detection portion 13 detects the change mode instruction which is inputted by the user to the keyboard and judges the meaning of the instruction signal at step ST 61 and ST 62. If the instruction signal is the mode change signal, the control portion 1 stores a new selected mode in the call mode store portion 11 at step ST 63. Then the control portion 1 resets the system at step ST 64 as explained in FIG. 7 and starts the new mode from the beginning.

(Third Embodiment)

In the above second embodiment in FIG. 6, the dual mode mobile telephone apparatus does not have compatibility between the two analog modes. But, the present invention may also be applied to a dual mode mobile telephone apparatus having non-compatible analog modes and digital modes.

FIG. 1 is a block diagram of a third such embodiment of a dual mode mobile telephone apparatus of the present invention. In FIG. 1, the circuit construction is the same with the first embodiment, therefore the detailed explanation is omitted.

Figure 10:
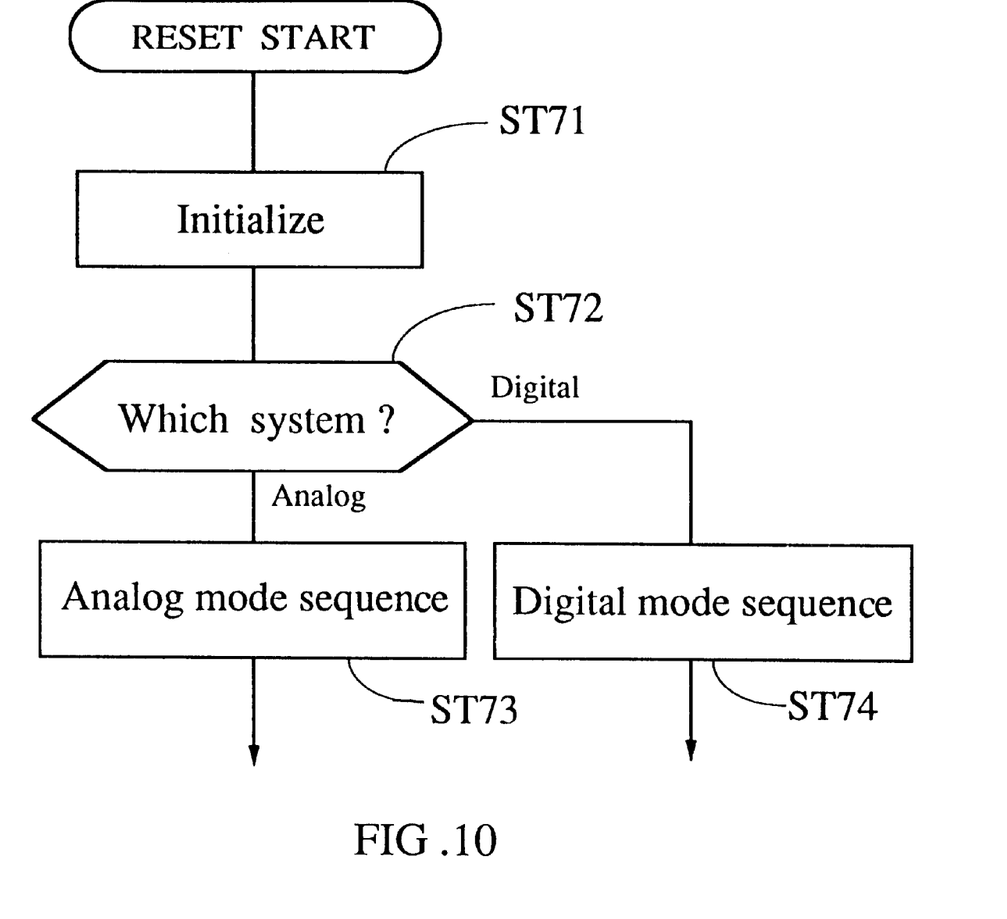
FIG. 10 is a flow chart which shows a mode change sequence of the third embodiment.

FIG. 10 is a flow chart which shows the mode change sequence of the third embodiment.

Figure 11:
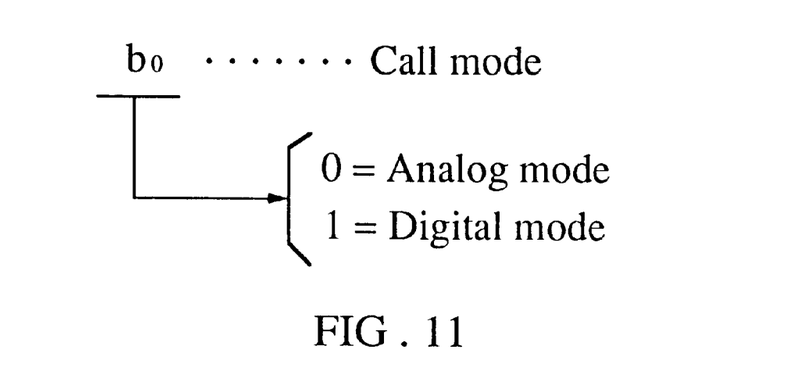
FIG. 11 is a bit configuration of the call mode in the third embodiment.

In the third embodiment, if the user wants to change the mode, he inputs the mode change instruction to the keyboard 4. The control portion 1 detects the mode change instruction from the keyboard, the control portion 1 initializes operation of the analog mode transmitting/receiving portion 2, the digital mode transmitting/receiving portion 3, the hardware in the operation portion 4 and RAM 1b, and the I/O 1e in the control portion at step ST 71. The control portion judges the call mode which is stored in the call mode store portion 11 at step ST 72. FIG. 11 is the bit configuration of the call mode bit $b_0$ of the third embodiment. The call mode consists of $b_0$ bit. If the $b_0$ bit is "0", then the call mode indicates the analog mode, and if the $b_0$ bits is "1", then it indicates the digital mode as shown in FIG. 11. At step ST 72, if the $b_0$ bit is "0", then the analog mode is executed at step ST 73, and if the $b_0$ bit is "1" then the digital mode is executed at step ST 74.

The mode change operation of the third embodiment is the same as explained in the second embodiment, in the case where the user makes the request during the communication state. Therefore the detailed explanation is omitted.

(Fourth Embodiment)

Figure 15:
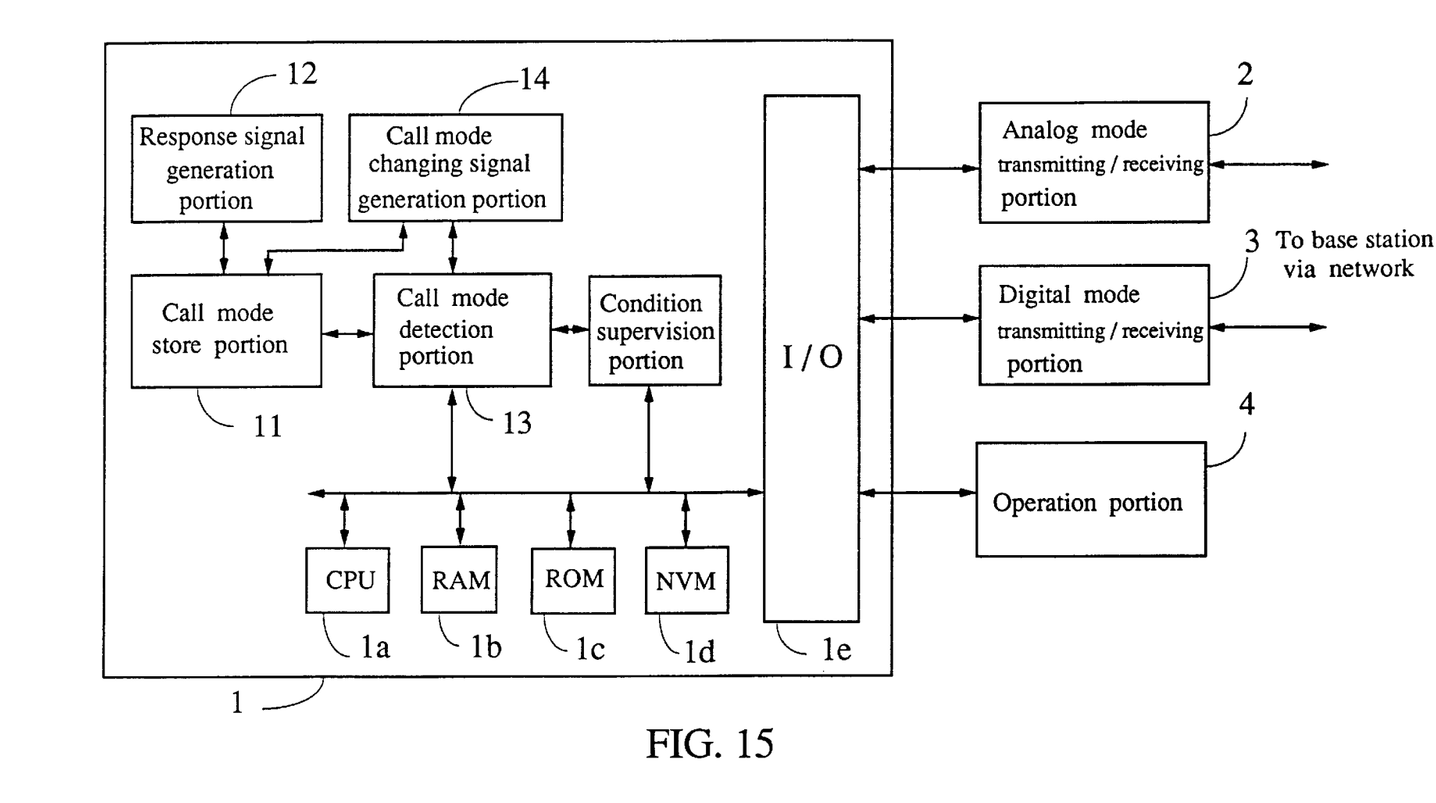
FIG. 15 is a block diagram of a fourth embodiment of a dual mode mobile telephone apparatus of the present invention.

FIG. 15 is a block diagram of a fourth embodiment of a dual mode mobile telephone apparatus of the present invention. In this embodiment, the mode change is executed using the instruction code by the user at the keyboard. But in the fourth embodiment, the mode change is executed automatically by supervising the different kinds of conditions, for example, communication quality, traffic condition and call charge etc. The above conditions are stored beforehand in the memory. A condition supervising portion 15 supervises continuously the line conditions, and automatically judges the changing of the line conditions. And if the line conditions change, the condition supervising portion 15 compares the detected conditions with the predetermined stored conditions and selects a more advantageous mode which is stored in the call mode store portion 11. The response signal generating portion 12 generates a response signal and sends it back to the base station. The other operations are the same as in the first embodiment, and therefore the detailed explanation is omitted.

What is claimed is:

1. A dual mode mobile telephone apparatus for transmitting and receiving signals between a base station and a mobile station using a radio line comprising:
   a transmitting/receiving portion for transmitting and receiving signals of different kinds of call modes, said different kinds of call modes comprising a digital call mode and an analog call mode an operation portion for assigning an available call mode for the mobile station selected by the user from among said different kinds of call modes;

a call mode detection portion for detecting the call mode selected from among said different call modes;

a call mode store portion for storing the call mode which is detected by the call mode detection portion; and a response signal generating portion for receiving a calling signal from the base station and generating a response signal which is sent back to the base station in response to the calling signal from the base station, said response signal including the call mode detected by said call mode detection portion.

2. The dual mode mobile telephone apparatus of claim 1, further comprising:

a call mode changing signal generation portion for generating a call mode changing signal according the calling signal detected in the call mode detection portion.

3. The dual mode mobile telephone apparatus of claim 2, wherein said call mode changing signal generation portion includes means for generating a call mode changing signal while said apparatus is in the communication state, in the case of a plurality of modes having compatibility.

4. The dual mode mobile telephone apparatus of claim 2, wherein said call mode changing signal generation portion includes means for generating a call mode changing signal while said apparatus is in the communication state, in the case of a plurality of modes having non-compatibility.

5. The dual mode mobile telephone apparatus of claim 2, wherein said call mode detection portion includes means for detecting the call mode which is inputted from the operation portion by the user.

6. The dual mode mobile telephone apparatus of claim 2, wherein said apparatus includes condition supervision means for supervising predetermined line conditions and said call mode changing signal generation portion includes means for generating a call mode changing signal in response to a change in a predetermined condition affecting communication quality, traffic and call charge as detected by said condition supervising means.

* * * * *